H. BLUMENBERG, Jr.
PROCESS OF PRODUCING POTASSIUM NITRATE.
APPLICATION FILED JAN. 2, 1918.
1,296,460.
Patented Mar. 4, 1919.
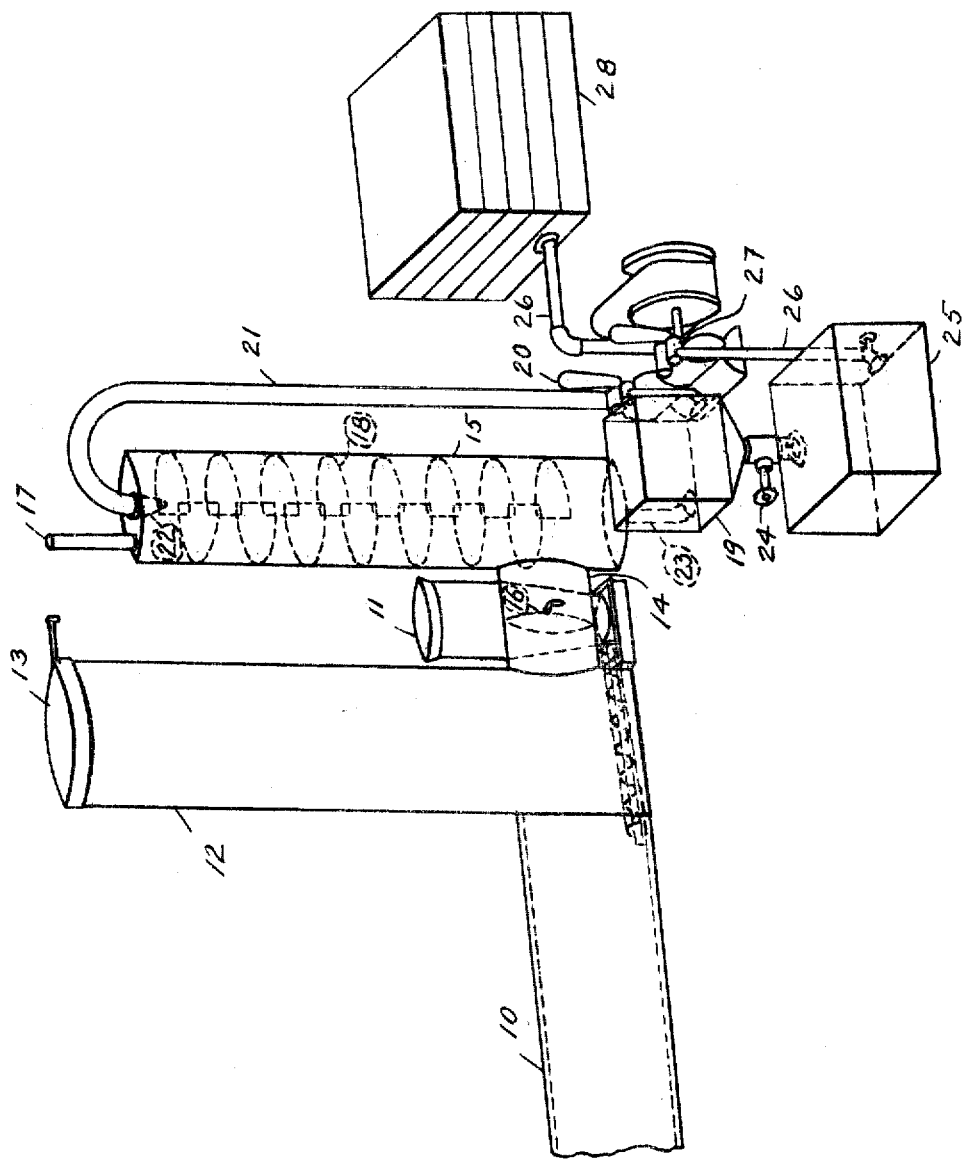
Inventor:
Henry Blumenberg Jr,
by Hazard & Miller
Attys.

UNITED STATES PATENT OFFICE.

HENRY BLUMENBERG, JR., OF LOS ANGELES, CALIFORNIA.

PROCESS OF PRODUCING POTASSIUM NITRATE.

1,296,460.  Specification of Letters Patent.  Patented Mar. 4, 1919.

Application filed January 2, 1918. Serial No. 209,978.

*To all whom it may concern:*

Be it known that I, HENRY BLUMENBERG, Jr., a citizen of the United States, residing at Los Angeles, in the county of Los Angeles and State of California, have invented new and useful Improvements in Processes of Producing Potassium Nitrate, of which the following is a specification.

My invention relates to a process of producing potassium nitrate, direct from the waste gases of cement kilns, or any gases carrying potassium salts or oxids in suspension.

As well known, the great demand for potassium salts and the limited supply at the present time have turned the endeavors of inventors to sources of potassium supply which, until lately have not been considered as commercial propositions. It has been proposed to use potassium containing materials in the manufacture of hydraulic cement. The potassium is volatilized as $K_2O$ and carried with the flue gases which in addition to the products of combustion carry considerable amount of cement dust. An apparatus is provided for recovering the potassium carried in these flue gases, but considerable difficulty has been experienced in devising a process or an apparatus for efficiently and economically recovering the potassium.

It is an object of this invention to devise a simple yet efficient process of recovering the potassium from the waste gases of cement kilns and the like which as stated above occurs usually in the form of $K_2O$. My process is based on the fact that potassium bases have an intense affinity for nitrogen oxids replacing the weaker bases. It is well known that practically all the metal nitrates are decomposed at a temperature of red heat, liberating the nitrogen oxids, but the affinity of potassium for nitrogen oxid is so intense that a white heat is required before decomposition takes place, and consequently potassium nitrate is practically the only salt containing nitrogen oxids which must be heated beyond the disassociation temperature of nitrogen oxid before the decomposition takes place.

My invention consists of the steps in the process hereinafter described and claimed.

In the accompanying drawings which form a part of this specification, I have illustrated by way of example, an apparatus suitable for carrying out my process.

In the drawings, 10 designates a portion of a cement kiln which is here shown to be of a rotary cylindrical type. 11 indicates a suitable apparatus whereby the raw material is fed into the stack end of the cement kiln 10. The waste gases enter the lower end of a stack or chimney 12, which, however, is only used when for any reason the potassium nitrate recovering apparatus hereinafter described is not in operation. 13 is a lid or damper normally closing the stack 12. 14 is a conduit for conveying the waste gases into a precipitating chamber or tower 15. 16 is a slide-valve whereby the conduit 14 may be closed. The tower 15 has an exit 17 at the top. A series of baffle plates 18, which are here shown arranged in staggered relation, but which may be of any preferred construction, is provided in the interior of the tower 15. 19 is a tank from which, by means of a pump 20, a liquid may be pumped through pipe 21 to the top of the tower 15 and there sprayed by means of a nozzle 22. The liquid is retarded in its downward passage by the baffle plates 18 in the well-known manner, thereby allowing the same to become intimately mixed with the waste gases coming from the cement kiln 10. The liquid collecting at the bottom of the tower 15 is returned, by means of pipe 23, to the tank 19 which latter is provided with a valved outlet pipe 24 whence the liquid may be conveyed to an evaporating pan 25, which, by means of a valved pipe 26 and pump 27, is connected to a filter press 28 for separating the liquid from the solid constituents.

In the operation of my process, I prepare a solution of sodium nitrate in the tank 19 and circulate the same by means of the pump 20 through the precipitating tower 15. The sodium nitrate solution will on contact with the waste gases carrying potassium oxids, potassium silicates and carbon dioxid form sodium carbonate, hydrosilicates, aluminum hydroxid, and potassium nitrate. Only a small quantity of aluminum hydroxid, not exceeding one to two per cent. is formed. The same is derived from the aluminum silicates carried in the waste gases. The following equation explains the reaction:

$$2NaNO_3 + K_2O + CO_2 = 2KNO_3 + Na_2CO_3$$

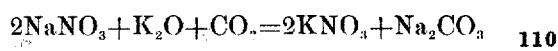

The equation just given is representative of the reaction taking place. It should be remembered, however, that there are other potassium compounds such as potassium silicates or potassium sulfate present in the waste gases which will react with the metal nitrate to form potassium nitrate. Potassium sulfate is present in rather large quantities when in place of powdered coal, a fuel oil is used, which normally carries a very large percentage of sulfur compounds.

As explained above, the potassium being the stronger base will displace the sodium from the sodium nitrate and form potassium nitrate. In my process the gas tension is broken down because of the chemical affinity of the carbon dioxid for the sodium salts and the alkaline constituents of the cement dust. As cement dust carries large quantities of calcium oxid, calcium carbonate is formed. At suitable intervals the magma or slurry in the tank 19 is drawn off into the evaporating pan 25 where the slurry is heated to render the gelatinous silicates insoluble. Hot water is now added to the mass and the same is pumped through the filter press 28, thereby separating the soluble salts, sodium carbonate and potassium nitrate from the insoluble constituents of the mass. The sodium carbonate is separated from the potassium nitrate by the usual methods of crystallization. The potassium nitrate, as well known, forms an ideal fertilizer because of its potassium and nitrogen contents.

I have described the above process of producing potassium nitrate from gases carrying potassium salts or potassium oxid in suspension by the treatment with sodium nitrate. My invention however, is applicable to other metal nitrates, such as the alkaline earth nitrate and alkali metal nitrates. In fact any metal nitrate for instance, lead nitrate, may be used in place of sodium nitrate, but for commercial reasons sodium nitrate would be used under normal commercial conditions.

Various changes in the steps of the process may be made without departing from the spirit of my invention as claimed.

I claim:

1. A process of recovering potassium salts from gases containing potassium compounds in suspension, comprising contacting said gases with a metal nitrate solution, thereby forming potassium nitrate, and separating the potassium nitrate from the mixture.

2. A process of recovering potassium salts from gases, containing potassium compounds, comprising contacting said gases with a sodium nitrate solution, thereby forming potassium nitrate, and separating potassium nitrate from the mixture.

3. The process of recovering potassium salts from gases, containing potassium compounds and cement dust in suspension and carbon dioxid, comprising contacting said gases with a metal nitrate solution, thereby forming potassium nitrate and separating the potassium nitrate from the mixture.

4. A process of recovering potassium salts from gases containing potassium compounds and cement dust in suspension, and carbon dioxid, comprising contacting said gases with a sodium nitrate solution, thereby forming potassium nitrate and sodium carbonate and hydrosilicates, evaporating to dryness to render the silicates insoluble, mixing with water and separating the potassium nitrate from the mixture.

In testimony whereof I have signed my name to this specificaton.

HENRY BLUMENBERG, Jr.